(12) United States Patent
Tillman et al.

(10) Patent No.: US 9,683,139 B1
(45) Date of Patent: Jun. 20, 2017

(54) COMPOSITE WOOD ADHESIVE FILLER

(71) Applicant: Ply-Bond Chemical and Mill Supplies, Inc., Virginia Beach, VA (US)

(72) Inventors: Donald N. Tillman, Virginia Beach, VA (US); Todd J. Giesfeldt, Sun Prairie, WI (US)

(73) Assignee: Ply-Bond Chemical and Mill Supplies, Inc., Virginia Beach, VA (US)

( * ) Notice: Subject to any disclaimer, the term of this patent is extended or adjusted under 35 U.S.C. 154(b) by 0 days.

(21) Appl. No.: 14/717,543

(22) Filed: May 20, 2015

Related U.S. Application Data

(60) Provisional application No. 62/000,863, filed on May 20, 2014.

(51) Int. Cl.
| | | |
|---|---|---|
| *C08L 97/02* | (2006.01) |
| *C09J 101/02* | (2006.01) |
| *C09J 189/00* | (2006.01) |
| *C09J 197/00* | (2006.01) |
| *C09J 161/06* | (2006.01) |
| *C09J 161/00* | (2006.01) |
| *C09J 161/28* | (2006.01) |
| *C09J 161/24* | (2006.01) |

(52) U.S. Cl.
CPC ............ *C09J 101/02* (2013.01); *C09J 161/00* (2013.01); *C09J 161/06* (2013.01); *C09J 161/24* (2013.01); *C09J 161/28* (2013.01); *C09J 189/00* (2013.01)

(58) Field of Classification Search
CPC ...... C09J 101/02; C09J 161/00; C09J 189/00; C09J 197/00; C08L 97/02
See application file for complete search history.

(56) References Cited

U.S. PATENT DOCUMENTS

| | | |
|---|---|---|
| 3,775,144 A | 11/1973 | Ware et al. |
| 3,775,145 A | 11/1973 | Ware et al. |
| 3,793,113 A | 2/1974 | Pearson |
| 3,907,728 A | 9/1975 | Lambuth et al. |

(Continued)

FOREIGN PATENT DOCUMENTS

| | | |
|---|---|---|
| BR | 7803385 | 12/1979 |
| JP | 56014571 | 2/1981 |

(Continued)

OTHER PUBLICATIONS

Naidu, et al., "Effects of Ground Corn Particle Size of Ethanol Yield and Thin Stillage Soluble Solids" Cereal Chemistry, vol. 84, No. 1, pp. 6-9, Jan.-Feb. 2007.

(Continued)

*Primary Examiner* — Brieann R Fink
(74) *Attorney, Agent, or Firm* — Williams Mullen, PC; M. Bruce Harper

(57) ABSTRACT

An improved composite wood adhesive filler, a method of producing such a filler, and an adhesive mixture including such filler are provided, with the filler having performance satisfactory to the manufacturing needs of composite and ply wood products. The adhesive mixture may comprise a filler and one or more extenders. The filler can replace extenders for weight, without introducing instability or viscosity problems. The filler may be drawn from the residue co-product of cellulosic ethanol production using corn stover as feed stock material, which would otherwise be a waste product.

14 Claims, 1 Drawing Sheet

(56) References Cited

U.S. PATENT DOCUMENTS

| | | | |
|---|---|---|---|
| 4,070,314 | A | 1/1978 | Alexander et al. |
| 4,082,903 | A | 4/1978 | Chow |
| 4,105,606 | A | 8/1978 | Forss et al. |
| 4,200,723 | A | 4/1980 | Chen |
| 4,324,747 | A * | 4/1982 | Sudan ............... C08L 61/14 264/13 |
| 4,400,467 | A | 8/1983 | Bauer et al. |
| 4,568,714 | A | 2/1986 | Overholt |
| 4,801,631 | A | 1/1989 | Sachs et al. |
| 4,941,922 | A | 7/1990 | Snyder |
| 4,942,191 | A | 7/1990 | Rogers |
| 5,017,319 | A | 5/1991 | Shen |
| 5,202,403 | A | 4/1993 | Doering |
| 5,459,207 | A | 10/1995 | Saigan et al. |
| 5,556,906 | A | 9/1996 | Collins et al. |
| 5,609,711 | A | 3/1997 | Miller |
| 5,763,509 | A | 6/1998 | Eastin et al. |
| 5,895,545 | A | 4/1999 | Miller |
| 6,147,206 | A | 11/2000 | Doner et al. |
| 6,254,914 | B1 | 7/2001 | Singh et al. |
| 6,485,945 | B1 | 11/2002 | Potter et al. |
| 6,899,910 | B2 | 5/2005 | Johnston et al. |
| 6,962,722 | B2 | 11/2005 | Dawley et al. |
| 7,101,691 | B2 | 9/2006 | Kinley et al. |
| 8,293,821 | B1 * | 10/2012 | Tillman ............... C09J 103/02 264/533 |
| 2002/0065400 | A1 | 5/2002 | Raskin et al. |
| 2002/0132972 | A1 | 9/2002 | Giroux et al. |
| 2003/0216492 | A1 | 11/2003 | Bowden et al. |
| 2004/0249065 | A1 | 12/2004 | Schilling et al. |
| 2005/0101700 | A1 | 5/2005 | Riebel |
| 2005/0222358 | A1 | 10/2005 | Wescott et al. |
| 2005/0250900 | A1 | 11/2005 | Stofko |
| 2006/0147582 | A1 | 7/2006 | Riebel |
| 2007/0020476 | A1 | 1/2007 | Kintzley et al. |
| 2007/0036958 | A1 | 2/2007 | Hagemann et al. |
| 2007/0148339 | A1 | 6/2007 | Wescott et al. |
| 2012/0102823 | A1 * | 5/2012 | Hennessey ............ C10L 1/00 44/307 |
| 2015/0101751 | A1 * | 4/2015 | Ogle ............... C08L 5/00 156/336 |

FOREIGN PATENT DOCUMENTS

| | | |
|---|---|---|
| JP | 52019732 | 2/1997 |
| WO | 2008035042 | 3/2008 |

OTHER PUBLICATIONS

Wang, et al., "Comparison of Raw Starch Hydrolyzing Enzyme with Conventional Liquefaction and Saccharification Enzymes in Dry-Grind Corn Processing", Cereal Chemistry, vol. 84, No. 1, pp. 10-14, Jan.-Feb. 2007.

Selling, et al., "Nonfood Utilization of Cereal and Soy Based Co-Products", USDOA, Agricultural Research Service, 2006 Annual Report, /www.ars.usda.gov/research/projects/projects.htm/.

"Coproducts and Near Coproducts of Fuel Ethanol Fermentation From Grain" Agriculture and Agri-Food Canada, / res2.agr.ca/publications/cfar/chap2_e.htm/.

"S1007: The Science and Engineering for Biobased Industry and Economy", SAES-422: S1007, Nov. 6-7, 2003, /imiss.umd.edu/homepages/saes.cfm?trackID=1934/.

Donovan, John W., "Phase Transitions of the Starch-Water System", Biopolymers, vol. 18, 1979, pp. 263-275.

* cited by examiner

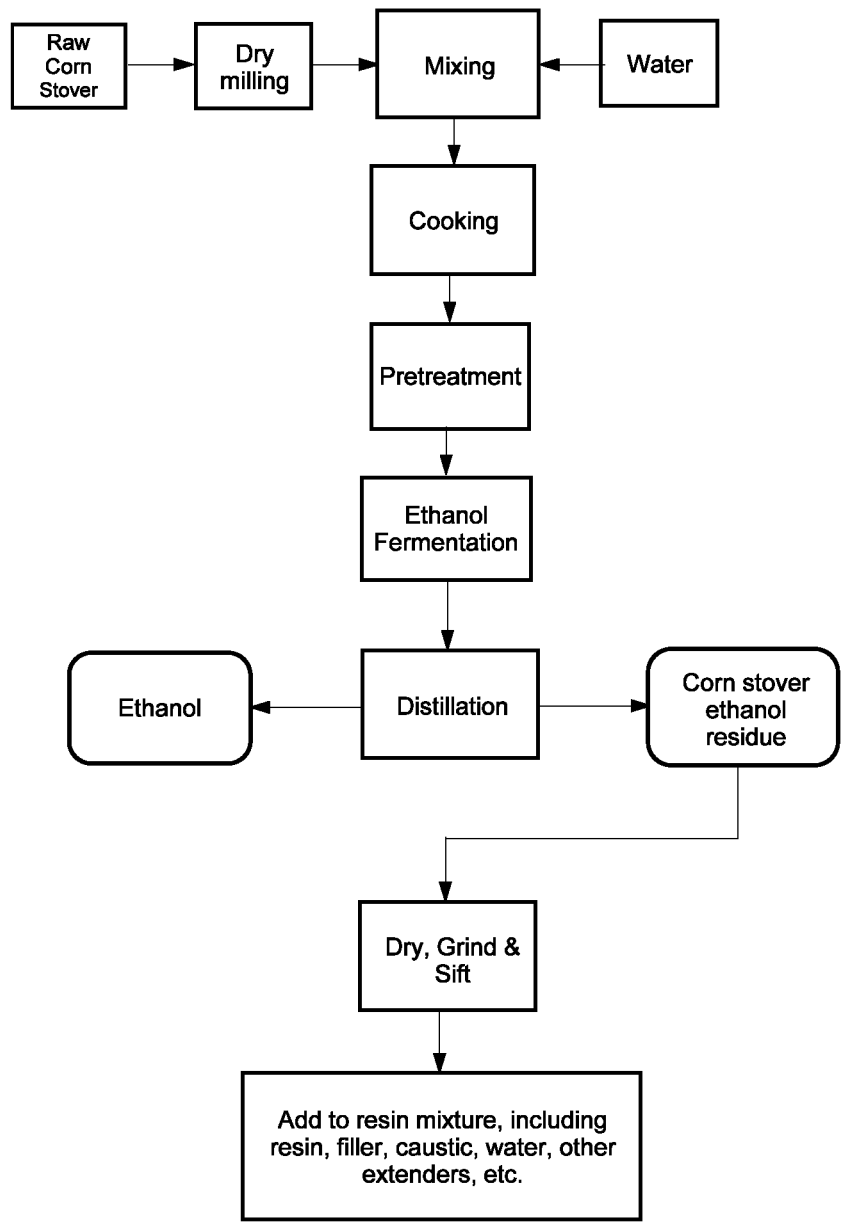

ated strand board, for example, is made by the addition of
COMPOSITE WOOD ADHESIVE FILLER

CROSS REFERENCE TO RELATED APPLICATIONS

This application claims the benefit of U.S. Provisional Application No. 62/000,863, filed May 20, 2014, which is hereby incorporated in its entirety.

FIELD OF THE INVENTION

The invention relates generally to the bonding of cellulose materials. More particularly, the invention is directed to a filler of adhesives used in bonding cellulose materials, such as composite wood products.

BACKGROUND OF THE INVENTION

Composite woods products may be described as falling into five classes, each characterized by the treatment of the wood within the product: plywood, oriented strandboard, particleboard, hardboard, and fiberboard. For each class of composite wood, the configuration of the wood contributes to that product's physical properties and typical application. In addition, the adhesive, the density of the wood, and additives such as resin or fire retardants, may change the characteristics of the product.

Most composite woods are made using a thermosetting or heat curing adhesive to bind or hold the cellulose wood fibers together during the process of manufacturing. Oriented strand board, for example, is made by the addition of adhesive to layers of shredded wood strands configured in certain orientations, followed by thermal pressing. Commonly used composite wood adhesive mixtures include resin binders of formaldehyde, urea-formaldehyde, melamine-formaldehyde, and isocyanate. Phenol-formaldehyde resins are typically used for manufacturing products that require some degree of durability under exterior exposure. Phenol may be condensed with formaldehyde to produce phenolic resins. Urea-formaldehyde resins are typically used in manufacturing products where dimensional uniformity and surface smoothness are of more concern than exterior durability (e.g., particleboard). Melamine-formaldehyde is an expensive resin used in decorative laminates or paper treatment. Isocyanates, such as di-phenylmethane di-isocyanate (or MDI) are also used in the manufacture of composite wood products. Natural adhesives, such as tannins, can be modified and reacted with formaldehyde to produce resins, as well. The curing characteristics of the resin, such as the cure temperature and time, are also additional factors to consider in the choice of resin. Urea- and phenol formaldehyde resins are most widely used in manufacturing composite wood products. Resin solids are generally mixed with a liquid vehicle or solvent, which acts as a carrier and a diluent.

Resin solids are expensive and may cause environmental and health problems. Oil shortages can cause further price increases. Formaldehyde is an irritant, a suspected carcinogen, and the resin base may release volatile organic compounds. (Toxicological Profile, ATSDR, DHHS-PHS 1999). Phenol formaldehyde or PF resin, being water proof and less expensive than other water proof resins, may be considered a leading resin or binder for shorthand reference herein.

An extender is a substance added to an adhesive mixture to serve an adhesive function, such as deeper adhesion in dense woods, tackier consistency, greater assembly time tolerance, etc. In the composite wood industry, flour is often used as an extender for these expensive resins. Extenders can reduce the overall cost of the adhesive mixture and the concentration of deleterious components that would otherwise compose a given volume of resin. Extenders may contribute to prepress tack and generally have some adhesive action or improvement to the final mixture, with the resin solids being the ultimate moisture resistant binder.

Extenders are often based on proteinaceous and amylaceous materials, and some of their desirable rheological properties may not be duplicated by more lignocellulosic-based materials. Flour extenders known in the field primarily include wheat flour, and also soy bean protein, casein, starch, oil cakes, corn flour, corn gluten protein, and seed gum. In some cases, wheat and other flours or materials may be mixed. The combination of gluten or protein and starch in wheat flour appears to aid in the adhesiveness or tack of the final mixture, making it one of the most widely used extenders. Yet wheat flour, although cheaper than resin, is still relatively expensive compared to many other natural alternatives. In use, wheat flour is also somewhat unpredictable or variable. The proteins in wheat flour can cause stringing and lumping of the adhesive mixture, and accumulation or build-up of glue on spray tips or other equipment, necessitating frequent cleaning. Thus, some have sought natural alternatives, such as fiber byproducts mixed with starch, but with limited commercial acceptance. It may generally be appreciated that a food product used as an extender will face economies different from those derived from a byproduct or process waste.

Extenders are often treated or modified to react with the resin to achieve adhesive performance, which can further increase the expense of the extender beyond the cost of materials. In some cases, the extender is treated so as to form a copolymer with the resin, or to enable the use of a reduced amount of phenol within an adhesive mixture, while still achieving a desired set of adhesive performance characteristics. While flour based extenders may be less expensive than PF resin, for example, they will carry at a minimum the market cost of the flour commodity and of any treatment steps.

In contrast, however, are additives referred to as fillers, which are generally non-adhesive compositions within the overall adhesive mixture. At the same time, though, fillers should not introduce adverse performance characteristics, such as unstable viscosities, poor spray-ability, or decreased adhesive strength. Some fillers are considered inert. In this way, materials that are suitable as fillers may be distinguished from materials suitable as extenders. As used herein, the term "filler" means a composition that is relatively non-adhesive and is added to an adhesive mixture to improve its working properties, permanence, strength, or other qualities. See, e.g., Sellers Jr., Terry, PLYWOOD AND ADHESIVE TECHNOLOGY 471 (1985). Fillers may also fill holes in a cracked or ruptured ply or veneer, decreasing porosity. Changes in economic or other factors, such as availability, mean that there is always a need for new or additional filler materials.

Accordingly, an object of the present approach is to provide a filler for use in composite wood products satisfactory to the performance and manufacturing needs, as well as a method for the production and use of such an adhesive or adhesive filler in the manufacture of composite wood products.

It is an object to accomplish the foregoing objective in a simple and cost effective manner.

Additional objects and advantages of embodiments will be set forth in part in the description which follows, and in part will be apparent from the description, or may be learned by practice of the invention. The objects and advantages of the invention will be obtained by means of instrumentalities in combinations particularly pointed out in the appended claims.

SUMMARY OF THE INVENTION

A substance is provided for the manufacture of composite wood products. As described herein, adhesives used in manufacturing composite wood products may be extended by the use of soy bean, wheat, or corn flour. Most of this use has centered on wheat flour for its adhesiveness and ease of use, despite higher cost, stringing, and lumping. However, extenders are generally expensive, and affect prepress characteristics. In the present approach, the quantity of extender in a composite wood adhesive may be reduced by a novel filler. This filler may be a residue of corn stover used in the yeast based production of ethanol. Adhesives made with corn stover ethanol residue have demonstrated acceptable viscosity, clean performance, and no adverse effects on mixture adhesiveness.

A method for manufacturing composite wood adhesive fillers is also provided, as well as an adhesive mixture having such fillers. In some embodiments, a method of manufacturing a corn stover ethanol residue and/or a composite wood adhesive is provided. The method may include the steps of preparing and/or providing corn stover as feedstock to yeast based ethanol fermentation. The method may include providing a relatively high protein and stable cellulosic fiber by-product based on corn stover residue from cellulosic ethanol production.

The present approach extends to composite wood adhesives or adhesive mixtures. Such a mixture may include a formaldehyde resin, added water, caustic, at least one extender; and about 1-10% weight of filler. In some embodiments, the filler may be cellulosic residue of cellulosic ethanol production from corn stover, wherein the residue includes fiber up to 60% weight, but with lignin of less than 50% weight, protein of 10-20% weight, and wherein the protein is 20-50% weight yeast protein. In other embodiments, the filler may be made of cellulosic residue of cellulosic ethanol production, where the residue includes fiber up to 60% weight, lignin of less than 50% weight, protein of 10-20% weight, and wherein the protein is 20-50% weight yeast protein having cell wall proteins of *saccharomyces cerevisiae*. Aspects include that the yeast protein may include cell wall proteins, and such yeast may be *saccharomyces cerevisiae*. In some embodiments, the protein includes 60-50% weight corn protein.

The filler cellulosic residue may have hemicellulose at less than 9% weight. Optionally, the cellulosic residue may further include mercerized cellulose at less than 20% weight. Embodiments of the adhesive may have a viscosity of 800 to 2,000 centipoises at a temperature of about 20-35 C. Embodiments of the adhesive may have a viscosity of 1,500 to 3,000 centipoises after 72 hours of holding at about 20-35 C.

BRIEF DESCRIPTION OF THE DRAWINGS

FIG. 1 is a block diagram of a process to produce a composite wood adhesive of the present approach.

DETAILED DESCRIPTION OF THE PREFERRED EMBODIMENTS

Introduction

The manufacturing of wood composite products varies considerably, depending on the type of product and the configuration desired. The manufacture of plywood may be considered illustrative for an embodiment of the present invention. Plywood refers to wood panels glued together under pressure. Typically, the grain within the wood panels is altered to enhance the strength and dimensional stability of the panels. The grain of the faces or outer plies is typically oriented longitudinally. Plywood often incorporates a core or inner ply of veneer, lumber, or particle board, such that the number of layers is commonly odd. The grain of the core plies runs parallel to the face plies. The adherence of the plies within a panel plays a large role in the successful performance of the panel. In order to test the sufficiency of the adhesive at the interface between the panels, it is typical to measure the wood failure at the bonded joints. Wood failure is measured by the area of wood fiber remaining at the glue line following completion of a specified shear test. In the present invention, the adhesive can produce a composite wood having a wood failure of about 85% or better.

To manufacture plywood, sheets of veneer are cut into the desired dimensions, and dried to acceptable moisture content, if necessary. An adhesive mixture may then be applied to the veneer plies by spray, roller, foaming, curtain coating, hand, etc. Spray application is commonly used to achieve consistent and thorough application. The veneer plies are then mechanically or manually placed together in a "lay up" step, which orients the grain of the different plies. Assembled panels then enter a cold pre-press to establish contact between the adhesive and the veneer plies, and to level or flatten the plies. The panels are then transferred to a hot press for thermosetting of the resin within the adhesive mixture.

The adhesive mixture and panels are preferably to be of appropriate moisture content. Too much moisture may lead to the formation of steam during the hot press step, which can bubble or escape, damaging the wood panel. Excessive moisture can also interfere with the resin cure times. The adhesive mixture is preferably sufficiently tacky after the cold pre-press step in order to prevent separation of the plies prior to the panel reaching the hot press step; however, the adhesive mixture should not be so viscous as to create manufacturing problems during application. Further, the adhesive mixture must be sufficiently liquid so as to enable even application or spraying, and to promote bonding with the wood, but not so thin as to introduce too much moisture, to flow off the panel, or to over penetrate.

As noted above, extenders may be added to adhesive mixtures or paste, so that the quantity of resin may be reduced. Flours have been used as conventional extenders within wood adhesive mixtures. Flour is a finely ground meal produced by milling the seeds or fruit of various cereals or other plants. Common types of flour used as extenders are wheat, corn, rice, oat, soybean, buckwheat, barley, rye, triticale, etc., with each carrying its market cost as a common commodity. Milling of flour typically, but not necessarily, involves removing the bran and germ portions of the kernel or grain from the starchy endosperm. The combination of gluten protein and starch in wheat flour appears to aid in the adhesiveness or tack of the final mixture, while the viscosity of wheat flour is appropriate for the manufacturing process. However, the protein in wheat may contribute to cleanliness problems, as discussed above. Standard corn flour has also been used to replace some portion of wheat flour; however, standard corn flour by itself lacks sufficient adhesiveness for acceptable extender performance in the step between the cold pre-press and the hot press. Other conventional alternatives appear to have focused on the use of lignin byproducts from the digestion of pulpwood, such as Kraft lignin from black liquor. While the price of flour fluctuates, it is generally more expensive than materials used in fillers.

Composite Wood Adhesives, Fillers, and Methods

The present approach includes composite wood adhesives or pastes, adhesive fillers, and methods or processes for the use and manufacture thereof. An adhesive may comprise a combination of a resin, water, caustic, at least one extender, and at least one filler. The total solids of some embodiments of the present adhesive paste may be present in the amount of about 40-46% and may include any resin known in the art, including but not limited to, phenyl-formaldehyde resin, urea-formaldehyde resin, melamine-formaldehyde resin and resol, such as a phenolic resol. The resin solids in the adhesive mixture may comprise about 26-35%. An aspect of the present approach is a filler or family of fillers based on the corn stover residue from cellulosic ethanol production.

The added water of some embodiments of adhesive mixture may be present in the amount of about 12-18%, which does not include the water present in other compounds in the adhesive mixture, such as the water present in the resin. The caustic may be present in the amount of about 1-5%, or more specifically, about 2-4%. The caustic may comprise caustic soda (NaOH), calcium hydroxide or any compound chemically similar to caustic soda, such as caustic alcohol ($C_2H_5ONa$). The caustic of the present invention may comprise about 50% solids. Optionally, embodiments of the adhesive may comprise about 0-0.5% soda ash.

Turning to the present approach, disclosed is a novel filler for use with resins such as phenol formaldehyde. In particular, some embodiments are directed to a composition of residual dry-form solids from the yeast based cellulosic fermentation of corn stover (or "corn stover ethanol residue"), with the scope of invention including methods for creating and using such a composition. Corn stover is generally the remainder of maize following harvest of the seeds or corn kernels, including portions such as cobs, leaves, husks; some sources characterize samples of unmodified corn stover as being about 36% cellulose, 21% xylan, and 18% lignin. See, e.g., Applied Biochemistry and Biotechnology, Spring 2005, Vol. 124, Issue 1-3, pp. 901-910. Yeast based cellulosic fermentation is a process for the production of ethanol and carbon dioxide from the inedible portions of plants, in this case, namely corn stover. Cellulosic fermentation may produce corn stover ethanol residue that lacks compounds that build viscosity in plywood paste, for example, and thus makes it suitable for use as a filler within an adhesive mixture. At the same time, the present approach provides a use for what had hitherto been a waste byproduct.

For clarity of contrast, an adhesive extender or co-adhesive material plays a particular role within the overall paste mixture. An extender permits the reduction of the quantity of resin (e.g., phenol formaldehyde or phenol), while also maintaining or improving paste adhesive performance and preserving stable viscosity. Adhesive extenders are often lignin rich materials that are used to produce lignin phenol formaldehyde. Some extenders are prepared using pretreatment methods such as altering lignin feedstock pH, steam explosion, hydrolysis, methylolation, or other means of copolymer formation. Some of these approaches describe "lignin rich" as being in excess of 70% lignin. Some alternatives disclose the use of lignin rich materials as an extender, but at quantities that lack desired performance characteristics, necessitating additional treatments.

As described above, the role or function of a filler is different from the role of an extender, and the filler material carries differences in composition and preparation. The inventors are unaware of any prior use of such corn stover ethanol residue as a filler in wood product adhesive mixtures.

In one embodiment of the present approach, corn stover ethanol residue may comprise mostly intact cellulosic fiber with low fat content (e.g., <about 3%) and a high protein content of about 10% weight or more. It is preferred that the dry material be prepared to about 6-12% moisture and a low pH when used as a filler. One embodiment showed a pH of about 4.1, which is lower than many other components of such adhesive mixtures.

The high level of protein in the composition would typically be expected to cause viscosity problems. Conventional wisdom is that an increase in protein will decrease pot life, with the protein increasing in viscosity over time to a point of instability for the mixture. See, e.g., Linda Lorenz, et al., "Analysis of Soy Flour/Phenol-Formaldehyde Adhesives for Bond Wood," Wood Adhesives 2005 Proceedings, 501-505, (Forest Prod. Soc'y, Madison Wis., 2006). Soy protein, for example, is high in protein and in a caustic environment increases paste or adhesive mixture viscosity. In addition, this protein can decrease paste stability over time. Such materials would be unsuitable for use as a filler without some compensating treatment or the inclusion of additional ingredients.

The high level of protein in the present composition is a function of the natural protein of the corn stover feedstock material (with any protein that may be added during processing), and that protein from the yeast in the fermentation. The yeast protein comprises a variety of proteins, which derive largely from structural proteins and glycoproteins bound within yeast cell walls or Cell Wall Proteins (CWP). It is believed that the cell wall comprises about 15-30% of the overall dry weight of yeast, with yeast being about 50% protein overall. The bound original state of CWPs is to be contrasted with proteins that might be considered free, unbound, exo-, or otherwise proximal but not integrated into a cell wall or other cell structure. In a caustic adhesive environment, this protein of the present filler has been discovered to lower paste viscosity. Without being limited to a particular theory, it is believed that originally bound protein of the present filler, such as those from CWPs, contributes to stable viscosities. In this case, the corn stover and yeast structural proteins and glycoproteins bound within yeast cell walls do not create instability. At the same time, it is also believed that corn stover alone, without pre-treatment, fermentation, and the additional residual protein from yeast, may provide less stable viscosities and lesser overall performance as a filler.

While the combined yeast and corn stover protein has been discovered to contribute to a lower viscosity, the high level of resulting cellulose has also been discovered to swell very little in the high pH of the ultimate adhesive or paste. Thus, the present composition of corn stover ethanol residue offers a high protein, high cellulosic material with unexpectedly good functionality and stability as an adhesive filler.

Thus, the present filler material contains certain elements in certain amounts that would not normally be found in filler, because the elements are not normally inert and can build viscosity over time. In particular, these elements are protein, hemicellulose, and treated or fermented cellulose. The protein is about 20-50% yeast protein (e.g., *saccharomyces cerevisiae*), and unlike soy or wheat protein, it does not grow in viscosity or swell in the high pH environment of the adhesive paste. Cellulose within the filler is pre-swollen or effectively mercerized by the pre-treatment of ethanol production/cellulosic fermentation, rendering it mostly inert and minimizing any paste viscosity increase raw cellulose might have. Most of the hemicellulose, which does swell in high pH of an adhesive paste is removed in this process. The lack or low percentage of hemicellulose contributes to a more stable viscosity.

An embodiment of the present approach to a filler may have five main components (and a number of minor components): (i) lignin; (ii) cellulose; (iii) hemicellulose; (iv) corn and yeast protein; and (v) ash. Minor components may be trace chemicals, organic acids, acetate, lactic acid, and minor carbohydrates, including some starch. In one tested embodiment, lignin made up about 42% of the filler. As discussed above, conventional thought about lignin is that it is not reactive enough (i.e., essentially inert) and must be chemically modified to be effective as an extender. In a filler, this treatment is not required and the stable viscosity of lignin did not harm the overall adhesive mixture. In that tested embodiment of filler, cellulose made up about 20% of the filler composition. The pre-treatment of cellulosic ethanol starting material mercerized the cellulose. There may be some swelling in a caustic environment, but mercerized cellulose exhibits a stable viscosity over time. In this embodiment, hemicellulose may be up to or less than about 8-9% weight of the present filler. By itself, hemicellulose does not build much initial viscosity in a high caustic environment. However, it may swell over time. The cellulosic residue is reduced to a sufficiently low level of hemicellulose, that the overall material swells only a manageable amount when in the adhesive residue, if at all. This enables an advantageous pot life. It was also noted that hydrolysis in a high caustic environment as a pretreatment to ethanol production contributed to relatively low molecular weight hemicellulose, which contributes to this aspect. As discussed above, protein may be about 10-20% weight, with this embodiment at 9-10% of the filler. In this embodiment, ash was about 13% weight of the filler, with ash unlikely to affect viscosity at this level, though higher ash may tend to lower viscosity. Absorption characteristics were equivalent to several other common fillers.

Embodiments of corn stover ethanol residue may comprise less than about 6-12% moisture which, when combined to produce an adhesive of the present approach, may produce a finished adhesive products having about 30-50% moisture.

As noted above, embodiments of the corn stover ethanol residue generally comprise unrefined biopolymer, cellular biomass, protein, and to a lesser extent, unfermented carbohydrates. Given the particular ethanol production process, apart from the corn protein and cellular mass, the material may also include yeast or yeast cell mass, phenolics, glucans, pentosans, salt minerals, and other biomass or lignin. There may also be small or trace amounts of organic acids (e.g., ferulic acid, galacturonic acid, lactic acid, etc.), fat, phytosterols, glycerol, acetate, furfural, hydroxymethylfurfural, and possibly starch. Below in Table 1 is an analytical breakdown (dry weight percent) of the components for an embodiment of the present adhesive filler, along with those for two conventional fillers—residue left from furfural production and alder bark:

TABLE 1

|  | Present Filler | Furfural Residue | Alder Bark |
|---|---|---|---|
| Lignin, % | 46.7 | 42.8 | 43.2 |
| Cellulose, % | 19.2 | 42 | 15.3 |
| Hemicellulose, % | 8.6 | 0.7 | 15.7 |
| Protein, % | 10.1 | 3.2 | 3.7 |
| Fat, % | 1.3 | 3.2 | 4.4 |
| Ash, % | 12.6 | 7 | 5.3 |
| Acetate, % | 1.6 | 0.6 |  |
| Other, % |  | .5 | 12.4 |
| Total | 100.1 | 99.5 | 87.6 |

As may be seen from the Table 1, the yeast based cellulosic fermentation results in only a minor increase in lignin, such that the corn stover ethanol residue may be considered as relatively lignin poor (i.e., less than 50%) in contrast to a number of the fillers or extenders discussed above. This is considered advantageous for a number of reasons. First, if an increase in lignin were desired, it would require additional processing in order to concentrate the lignin to reach a lignin rich state. This processing would add expense and time. Second, lignin rich materials are generally not inert, and often interact with the phenol formaldehyde, which is undesirable for a filler. Lignin rich materials also generally involve a post concentration treatment to bring the material to copolymerization, or some other form of bond with an aspect of the phenol formaldehyde. In the present approach, the relatively low levels of untreated ligninare suitable for use as a filler.

Yeast based fermentation of corn stover produces a residue that remains also relatively low in hemicellulose. This low level of hemicellulose, as well as the cellulose being rendered stable by pretreatment and yeast fermentation in ethanol production, make the residue acceptable for use as a filler.

Below in Table 2 is a detailed breakout of the composition of the present filler with those of corn cob residue of furfural production and modal:

TABLE 2

|  | Present Filler | Furfural Residue | Alder Bark |
|---|---|---|---|
| Arabinan | 0.7 | 0.1 | 1.6 |
| Glactan | 0.2 | 0.11 | 1.2 |
| Glucan | 19.3 | 42 | 15.3 |
| Xylan | 7.2 | 0.6 | 12.2 |
| Mannam | 0.5 | 0.1 | 0.6 |
| Carbohydrates | 27.3 | 42.7 | 30.9 |
| Insoluble lignin | 43.3 | 40.3 | 41.6 |
| Soluble lignin | 3.4 | 2.6 | 1.6 |
| Total lignin | 46.7 | 42.8 | 43.2 |
| Protein | 10.1 | 3.2 | 3.7 |
| Ash | 10.1 | 3.2 | 5.3 |
| Fat | 1.3 | 0.3 | 4.5 |

Table 3 is a detail of fiber content for the same materials:

TABLE 3

|  | Present Filler | Corn Cob Residue | Modal |
|---|---|---|---|
| Lignin | 46.7 | 42.8 | 43.2 |
| Cellulose | 19.2 | 42 | 15.3 |
| Hemicellulose | 8.6 | 0.7 | 15.7 |
| Sub-Total | 74.5 | 85.5 | 74.2 |
| Other | 25.5 | 14.5 | 25.8 |

Of course, consideration merely of composition does not reflect the differences that arise from the considerable differences in processing (e.g., the effect of pretreatment and yeast fermentation on cellulose), and how those differences might interplay.

An example of a process to produce corn stover ethanol residue filler is shown in the flow chart of FIG. 1.

With reference to FIG. 1, cellulosic ethanol production may begin with the collection of feedstock material, or corn stover. The corn stover may be processed in conventional steps of cleaning, compacting, storing, etc. The feedstock may be dry or hammer milled to an acceptable state for mixing with water and cooking. A variety of pretreatment steps may be employed, if desired. Some embodiments may include detoxification and neutralization as a portion of pretreatment, and hydrolysis may optionally be performed or considered as a pretreatment to fermentation (i.e., approached not as a combined hydrolysis and fermentation step). If applicable, some embodiments may process the feedstock below starch gelatinization temperatures, so that saccharification may occur directly from raw native insoluble starch to soluble glucose, bypassing conventional starch gelatinization conditions. Ethanol fermentation may include the separation of solids from liquids, with fermentation of hemicellulose sugars directly and enzymatic hydrolysis of solids prior to ultimate fermentation of the resulting cellulose sugars. As noted above, yeast has been shown to be beneficial, but other ethanologen approaches may also be suitable if the final material is consistent with the present approach. The fermented material may then be distilled. Upon production of ethanol, the corn stover ethanol residue may be recovered as one of the co-products.

Optionally, enzymatic production may be incorporated into the overall process. In some embodiments, hydrolysis enzymes may comprise cellulase or hemicellulose components such as those available from Novozymes A/S under the Celli® brand name. In some embodiments, enzymes may comprise fungal acid amylase and a glucoamylase at a pH of 3 to 6, for example. In some embodiments, chemical hydrolysis may be employed.

Thus, a filler of the present approach may be formed from the residue of cellulosic fermentation. The desired fermentation characteristics of the process may be designed with consideration of the coproducts desired. The residue may be a product of a two-step process if appropriate and/or optional pretreatment followed by the specific fermentation. For example, in some cases, the pretreatment may include a physiochemical pretreatment, such as Ammonia fiber explosion (AFEX) cellulosic pretreatment. AFEX processes may need no neutralization step, but could add ash to the residue. Other pretreatments may include conventional cellulosic pretreatments, neutralization steps (e.g., removing yeast inhibitors). Optional variations in fermentation organisms may include any of a variety of yeast, such as yeast fermenting 6-carbon sugar (starch and cellulose), or yeast fermenting 5-carbon sugar (hemicellulose). In some embodiments, the process will leave the cellulose intact, though amorphous and de-crystallized. Notably, the corn stover ethanol residue may be dried or dehydrated and is easily ground to a −100 or −200 U.S. mesh material, with this grinding taking less energy than other comparable conventional materials.

As noted above, the present approach may be used as a filler or additive for adhesive mixtures having phenol formaldehyde. Substances used primarily for replacement of phenol or phenol formaldehyde require different characteristics, including adhesiveness, and are often predominately lignin rich.

An adhesive mixture including corn stover ethanol residue may be processed as is known in the art, or as described herein. In one embodiment, the resin may be added at different steps of processing the adhesive. However, addition of a portion of the resin at the beginning of the process may lower the viscosity as compared to a process of adding the resin at a later step. It is believed that addition of a portion of the resin at the beginning of the process stabilizes the mixture, which ultimately leads to an adhesive product having a lower viscosity. For example, the adhesive may be processed by combining water at about 100-130° F. and about 30-40% of the total resin in a mixer, and blending for about three minutes. (An extender may be subsequently added to the blend, if desired.)

Next, the corn stover ethanol residue filler may be added to the blend followed by about a five to ten minute mixing period. Caustic may be subsequently added to the blend and mixed for about fifteen minutes, which may increase the blend to a pH of about 8-12. Optionally, soda ash may be blended into the mixture after the caustic. Finally, the remainder of about 60-70% of the total resin may be added to the blend to complete the adhesive mixture. While it is believed that the foregoing steps of addition of the various ingredients comprise one method of addition, one skilled in the art may modify the steps of addition depending on desired characteristics of the finished adhesive product. Additionally, one of ordinary skill in the art may modify the process to add all ingredients without timed holds.

The adhesive mixture may be blended for a total time of about one to two hours. The foregoing components of the adhesive mixture may be heated to a desired temperature to aid in the dispersion or digestion of the components into the mixture. Optionally, digestion of the materials may be increased using timed holds, which are intermediate durations of time in between mix times in which the mixer ceases mixing to allow the ingredients to better disperse or digest to form the adhesive mixture. Until the adhesive is used, it may be stored and placed in a recycle system to control the viscosity. For example, the finished adhesive product may optionally have a viscosity of 800 to 2,000 centipoises at a temperature of about 20-35° C. With the use of a low shear stirred tank with a recycle, the adhesive of the present invention may maintain a viscosity of 1,500 to 3,000 centipoises after 72 hours holding time at about 20-35° C. Alternatively, the adhesive may be processed in high shear systems.

As noted above, an adhesive (including corn stover ethanol residue) may be sprayed onto composite wood or wood plies, so an adhesive mixture of too high viscosity may impede mixture flow or damage equipment. When the wood plies exit the cold press, the adhesive mixture should be able to retain adhesion among the various plies in the panel. Thus, the present composition involves preparation of an embodiment and mixing the filler into the adhesive. The present approach is intended to incorporate corn stover ethanol residue as a filler into a manufacturing process for composite wood products, such as plywood, with only minor changes in the overall manufacturing processes that are familiar to those of ordinary skill in the field (i.e., unless one includes the process of preparing the corn stover ethanol residue.)

The adhesive mixture of the present invention is preferably water resistant. While the resin in the claimed invention is typically inherently water resistant, the addition of the remaining ingredients does not substantially diminish the water-resistance properties of the resin and produces a finished adhesive product which is also water resistant.

Each application or use of the present invention will introduce factors that are peculiar to that manufacturing process. Spinning disk resin applicators used in the manufacture of particle composites may require a viscosity different from that required for the manufacture of plywood, for example. Further, the composite wood product, and its intended use, may introduce additional or specific performance requirements. For example, particle board may require a higher concentration of resin to bind the smaller wood pieces into the finished product. Nevertheless, the present composition contemplates the requirements of adhesiveness and viscosity to be among the primary determining factors for most manufacturing processes. Other materials may be added to adapt to variations in manufacture process or product use.

It is contemplated that the filler may comprise about 1-about 10% weight of an adhesive mixture. The total quantity of the filler, extender (or any combination of primary and secondary extender), or other like component added to a resin mixture or paste will depend primarily on the minimum amount of resin solids required for effective bonding, but are commonly about 11-14% of the adhesive mixture. The mixture may also vary by type of wood (softwood or hardwood), wood product application, method of manufacture, and manufacturer. The mixture for southern pine plywood adhesive may comprise about 42-44% weight dry solids and about 56-58% weight added water. Of the dry solids content, a typical weight percent of combination of filler, extender, etc., may be about 11.8-14.5%, with resin solids comprising about 27-32%, and caustic soda (e.g., NaOH) about 2.7-3.2%. In contrast, hardwood plywood mixtures may have a solids weight percent of 56.6% of a combination of resin, filler and extender(s).

The actual resin and filler mixing process will depend on a wide variety of factors known to those skilled in the art. Some of these factors include the type of composite wood product, ambient conditions, the resin mixture constituents, mixture ratios, moisture content, required viscosity, intended resin delivery mechanism, etc. The mixing process may be adjusted in the ordering of steps, timing, quantities, temperature, etc. by those skilled in the art to adapt the process to the particular needs of the intended application.

In practice, an adhesive mixture having filler of corn stover ethanol residue may render the overall adhesive mixture much cleaner than mixtures with higher viscosity alternatives.

The following specific examples are set forth to more fully describe but are not intended to limit the scope of the invention. The filler may be used, for example, to decrease the amount of extender or other components used within an adhesive mixture, depending on the application, thereby saving material expense. The below adhesive mixtures may be made according to the following specifications, exhibiting consistent quality with respect to viscosity and with acceptable plywood manufacturing facility quality standards.

Example 1

|  | Weight Percent |
| --- | --- |
| Resin | 74.42 |
| Water | 11.64 |
| Caustic | 3.00 |
| Filler | 6.23 |
| Extender(s) | 4.16 |
| Soda Ash | 0.56 |

Example 2

|  | Weight Percent |
| --- | --- |
| Resin | 65 |
| Water | 18 |
| Caustic | 3 |
| Filler | 8.7 |
| Extender(s) | 5.3 |

Example 3

|  | Weight Percent |
| --- | --- |
| Resin | 65 |
| Water | 18 |
| Caustic | 3 |
| Filler | 9.6 |
| Extender(s) | 4.4 |

While the description above refers to particular embodiments of the present invention, it will be understood that many modifications may be made without departing from the spirit thereof. In addition, it is contemplated that the above described filler may be suitable for a variety of other applications due to its advantageous composition and characteristics. For example, the above filler has proven useful as an additive to oil wells for fluid loss control, sometimes referred to also as oilfield drilling mud. It is believed that the stable viscosity of the present filler contributes to predictable or manageable slurries, without harming cementitious structures. The above description is intended to cover such modifications and applications as would fall within the true scope and spirit of the present invention.

What is claimed is:

1. A composite wood adhesive comprising:
   a formaldehyde resin;
   added water;
   caustic;
   at least one extender; and
   about 1-10% weight of filler, the filler comprising dry form solid cellulosic corn stover residue at less than 12% moisture and yeast residue of cellulosic ethanol production from corn stover, wherein the corn stover residue comprises fiber up to 60% weight, lignin of less than 50% weight, and the filler includes protein of 10-20% weight, wherein the protein is 20-50% weight yeast protein.

2. The composite wood adhesive of claim 1, wherein the yeast protein comprises cell wall proteins.

3. The composite wood adhesive of claim 1, wherein the yeast is *saccharomyces cerevisiae* and the yeast protein comprises cell wall proteins.

4. The composite wood adhesive of claim 1, wherein the filler further comprises cellulosic residue having hemicellulose at less than 9% weight.

5. The composite wood adhesive of claim 4, wherein the cellulosic residue further comprises mercerized cellulose less than 20% weight.

6. The composite wood adhesive of claim 5, wherein the adhesive has a viscosity of 800 to 2,000 centipoises at a temperature of about 20-35 C.

7. The composite wood adhesive of claim 5, wherein the adhesive has a viscosity of 1,500 to 3,000 centipoises after 72 hours of holding at about 20-35 C.

8. The composite wood adhesive of claim 1, wherein the protein consists of 20-50% weight yeast protein and 80-50% weight corn protein.

9. A composite wood adhesive comprising:
a formaldehyde resin;
added water;
caustic;
at least one extender;
about 1-10% weight of filler, the filler comprising dry form solid cellulosic corn stover residue at less than 12% moisture and yeast residue of cellulosic ethanol production, wherein the corn stover residue comprises fiber up to 60% weight, lignin of less than 50% weight, and the filler includes protein of 10-20% weight, wherein the protein is 20-50% weight yeast protein having cell wall proteins of *saccharomyces cerevisiae*.

10. The composite wood adhesive of claim 9, wherein the filler further comprises cellulosic residue having hemicellulose at less than 9% weight.

11. The composite wood adhesive of claim 10, wherein the cellulosic residue further comprises mercerized cellulose less than 20% weight.

12. The composite wood adhesive of claim 11, wherein the adhesive has a viscosity of 800 to 2,000 centipoises at a temperature of about 20-35 C.

13. The composite wood adhesive of claim 11, wherein the adhesive has a viscosity of 1,500 to 3,000 centipoises after 72 hours of holding at about 20-35 C.

14. The composite wood adhesive of claim 9, wherein the protein consists of 20-50% weight yeast protein and 80-50% weight corn protein.

* * * * *